(12) United States Patent
Jacobson et al.

(10) Patent No.: US 9,811,364 B2
(45) Date of Patent: *Nov. 7, 2017

(54) THREAD OPERATION ACROSS VIRTUALIZATION CONTEXTS

(71) Applicant: Microsoft Technology Licensing, LLC, Redmond, WA (US)

(72) Inventors: Neil A. Jacobson, Acton, MA (US); Gurashish Singh Brar, Snoqualmie, WA (US); Kristofer Hellick Reierson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/917,421

(22) Filed: Jun. 13, 2013

(65) Prior Publication Data
US 2014/0373008 A1 Dec. 18, 2014

(51) Int. Cl.
*G06F 9/455* (2006.01)

(52) U.S. Cl.
CPC ............... *G06F 9/45558* (2013.01); *G06F 2009/45587* (2013.01)

(58) Field of Classification Search
None
See application file for complete search history.

(56) References Cited

U.S. PATENT DOCUMENTS

| 5,414,848 | A * | 5/1995 | Sandage et al. ............ 718/107 |
| 6,738,846 | B1 * | 5/2004 | Slaughter et al. ........... 710/260 |
| 7,509,639 | B2 * | 3/2009 | Worley, Jr. ...................... 718/1 |
| 7,539,987 | B1 | 5/2009 | Dey et al. |
| 8,499,299 | B1 * | 7/2013 | Jakab et al. ................. 718/102 |
| 8,863,126 | B2 * | 10/2014 | Poore et al. ...................... 718/1 |
| 2004/0098731 | A1 * | 5/2004 | Demsey et al. ............. 719/328 |
| 2004/0128670 | A1 * | 7/2004 | Robinson et al. ............... 718/1 |
| 2005/0050305 | A1 * | 3/2005 | Kissell ........................ 712/220 |

(Continued)

OTHER PUBLICATIONS

Office Action dated Aug. 26, 2015 cited in U.S. Appl. No. 13/917,468 (Copy Attached).

(Continued)

*Primary Examiner* — Mehran Kamran
(74) *Attorney, Agent, or Firm* — Workman Nydegger

(57) ABSTRACT

Application virtualization at the thread level, rather than at the process level. the operation of a thread across virtualization contexts. For instance, one virtualization context might be a native environment, whereas another virtualization context might be a virtualization environment in which code running inside a virtualization package has access to virtualized computing resources. A thread operating in a first virtualization context then enters an entry point to code associated with a second virtualization context. For instance, a native thread might enter a plug-in operating as part of a virtualized package in a virtualization environment. While the thread is operating on the code, the thread might request access to the second computing resources associated with the second virtualization environment. In response, the thread is associated with the second virtualization context such that the thread has access to the second computing resources associated with the second virtualization context.

19 Claims, 3 Drawing Sheets

(56) References Cited

U.S. PATENT DOCUMENTS

| | | |
|---|---|---|
| 2005/0076326 A1* | 4/2005 | McMillan et al. ............ 717/100 |
| 2005/0086650 A1* | 4/2005 | Yates et al. .................. 717/139 |
| 2005/0160424 A1 | 7/2005 | Broussard |
| 2006/0036851 A1* | 2/2006 | DeTreville .................... 713/159 |
| 2006/0075381 A1* | 4/2006 | Laborczfalvi et al. ....... 717/100 |
| 2006/0136916 A1* | 6/2006 | Rowland et al. ............. 718/100 |
| 2007/0061791 A1* | 3/2007 | Hartikainen .................. 717/148 |
| 2007/0067573 A1* | 3/2007 | Bruening et al. ............. 711/125 |
| 2008/0235710 A1* | 9/2008 | Challenger et al. .......... 719/316 |
| 2009/0007139 A1* | 1/2009 | Jacobson et al. ............. 719/313 |
| 2009/0178036 A1* | 7/2009 | Levine ............................... 718/1 |
| 2009/0235191 A1* | 9/2009 | Garbow ............. G06F 3/04815 715/764 |
| 2010/0153674 A1 | 6/2010 | Park et al. |
| 2010/0251236 A1* | 9/2010 | Sheehan et al. .................. 718/1 |
| 2010/0306764 A1* | 12/2010 | Khanna ............................. 718/1 |
| 2010/0318997 A1* | 12/2010 | Li et al. ......................... 718/104 |
| 2011/0219385 A1* | 9/2011 | Jacobson et al. ............. 719/328 |
| 2011/0238803 A1 | 9/2011 | Kern |
| 2011/0289503 A1* | 11/2011 | Toub et al. ................... 718/102 |
| 2012/0084607 A1 | 4/2012 | Lam et al. |
| 2012/0102505 A1* | 4/2012 | Dunker et al. ................ 719/318 |
| 2012/0272247 A1* | 10/2012 | Scott et al. ................... 718/108 |
| 2013/0166520 A1* | 6/2013 | Vass .............................. 707/694 |
| 2014/0373009 A1 | 12/2014 | Jacobson et al. |

OTHER PUBLICATIONS

Zhu et al. "JESSICA21: A Distributed Java Virtual Machine with Transparent Thread Migration Suppport" Dept. of Computer Science and Information Systems, University of Hong Kong.

Office Action dated Oct. 20, 2016 cited in U.S. Appl. No. 13/917,468 (Copy Attached).

Office Action dated Jan. 14, 2016 cited in U.S. Appl. No. 13/917,468 (Copy Attached).

Isoka, Derrick, "Accessing Virtual Application Resources", Published on: Nov. 11, 2011, Available at: http://blogs.technet.com/b/serverappv/archive/2011/11/11/accessing-virtual-application-resources.aspx.

"Allowing Applications Running Inside an App-V Virtual Environment (VE) to Read from or Write to the Native Registry", Retrieved on: Apr. 8, 2013, Available at: http://support.microsoft.com/kb/2750869.

Alvarez, Augusto, "Getting Started with Microsoft Application Virtualization 4.6", Retrieved on: Apr. 8, 2013, Available at: http://www.packtpub.com/sites/default/files/1261-chapter-7-managing-dynamic-suite-composition.pdf.

U.S. Appl. No. 13/917,468, Apr. 27, 2015, Office Action.

Office Action dated Jul. 27, 2017 cited in U.S. Appl. No. 13/917,468.

* cited by examiner

THREAD OPERATION ACROSS VIRTUALIZATION CONTEXTS

BACKGROUND

In application virtualization, an application is deployed to a client machine in a virtual environment. A virtual environment includes resources that are accessible to the application installed in that environment and includes files, registry keys, and so forth. Virtualization facilitation software intercepts many operating system Application Program Interface (API) calls (such as read request, write request, events, and so forth) that the application makes in the virtual environment. The virtualization facilitation software then redirects the calls to another location. This other location is a managed location that can be sandboxed on the client machine. Accordingly, the installation and operation of the application is isolated from the native environment of the client machine.

The virtualization facilitation software thus provides the illusion to the application installed in the virtual environment that the application is just running on the client machine in its normal environment, and thus the application has no information regarding the existence of such a virtual environment. Likewise, the operating system is also unaware of the virtual environment, but just receives API calls just as the operating system normally would.

This isolation means that an application can be cleanly installed and removed from the client machine, thus facilitating convenient application management. Furthermore, since the installed application is isolated from the native environment, the installed application is also isolated from other applications that might be running on the client machine. Thus, application virtualization permits applications to be more cleanly installed on, run in, and removed from a client machine.

Conventional application virtualization occurs at the process level. All threads of a process running in a virtual environment are also run in the virtual environment. These threads have access to all the virtual resources (such as files, registry keys, and so forth) of their process, but do not have access to virtual resources of other virtual environments. Likewise, threads running within native processes do not have access to any virtual resource in any virtual environment.

BRIEF SUMMARY

At least some embodiments described herein relate to the operation of a thread across virtualization contexts. For instance, one virtualization context might be a native environment, whereas another virtualization context might be a virtualization environment in which code running inside a virtualization package has access to virtualized computing resources.

A thread operating in a first virtualization context (such as a native environment) thus has access to first computing resources (such as native computing resources) associated with the first virtualization context. The thread then enters an entry point to code associated with a second virtualization context. For instance, a native thread might enter a plug-in operating as part of a virtualized package in a virtualization environment. The second virtualization context (e.g., a virtualization environment) has access to second computing resources (e.g., virtualized computing resources).

While the thread is operating on the code, an event is detected. For instance, the thread might request access to the second computing resources associated with the second virtualization context. In response, the thread is associated with the second virtualization context such that the thread has access to the second computing resources associated with the second virtualization context.

Accordingly, threads can cross virtualization contexts and be provided with access to the new virtualization context when access is requested. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
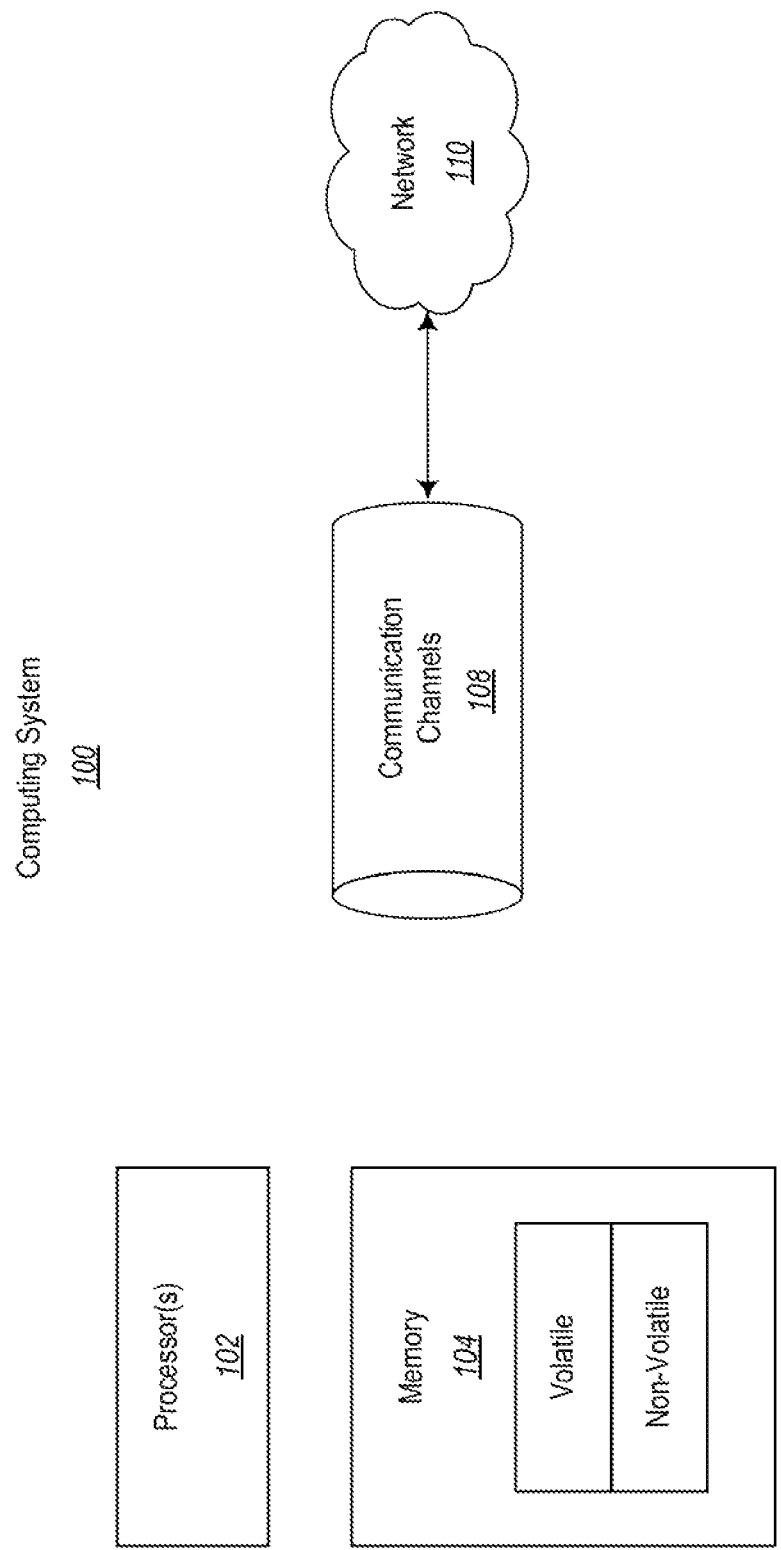
FIG. 1 abstractly illustrates a computing system in which some embodiments described herein may be employed.

At least some embodiments described herein relate to the operation of a thread across virtualization contexts. For instance, one virtualization context might be a native environment, whereas another virtualization context might be a virtualization environment in which code running inside a virtualization package has access to virtualized computing resources.

A thread operating in a first virtualization context (such as a native environment) thus has access to first computing resources (such as native computing resources) associated with the first virtualization context. The thread then enters an entry point to code associated with a second virtualization context. For instance, a native thread might enter a plug-in operating as part of a virtualized package in a virtualization environment. The second virtualization context (e.g., a virtualization environment) has access to second computing resources (e.g., virtualized computing resources).

While the thread is operating on the code of the second virtualization context, an event is detected. For instance, the thread might request access to the second computing resources associated with the second virtualization context. In response, the thread is associated with the second virtualization context such that the thread has access to the second computing resources associated with the second virtualization context.

Accordingly, threads can cross virtualization contexts and be provided with access to the new virtualization context when access is requested. This contrasts with the prior art method, in which threads of a process only run within the same virtualization context as the process itself, and the process itself is limited to one virtualization context. In the conventional process-based virtualization, the threads have access to all of the resources (such as files, registry keys, and so forth) of the parent process.

Unfortunately, the use of the prior art method substantially inhibits the use of plug-ins. When an application is installed in the native environment, the application registers associated plug-ins with the operating system. Other applications on the system can thus load and use these plug-ins. In contrast, when a virtual application is packaged, the associated plug-ins (called herein "virtual plug-ins") exist inside the package but are not registered with the operating system. Accordingly, native processes and processes running in other virtual environments will not see the plug-in registrations and therefore are unable to load the virtual plug-ins. Furthermore, even if these virtual plug-ins were registered with the operating system, the virtual plug-ins would not work if a native process or process running in a different virtual environment loaded them since many plug-ins require access to their virtual resources which would only be available to processes running inside the virtual environment of the virtual plug-in.

Techniques to allow virtual plug-ins to be more globally available are solved by allowing threads themselves to pass between virtualization contexts (e.g., between the native environment and a virtual environment, or between different virtualization environments). When a thread executes a plug-in, the thread temporarily enters the virtualization context associated with the plug-in, giving temporary access to the environmental resources upon which the plug-in relies. Furthermore, techniques described herein also register some information in the native environment, so that all processes are aware of the virtual plug-in. More generally speaking, the principles described herein allow more flexibly processing by allowing threads to execute across virtualization context boundaries.

Some introductory discussion of a computing system will be described with respect to FIG. 1. Then, embodiments of allowing threads to cross virtualization context boundaries will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
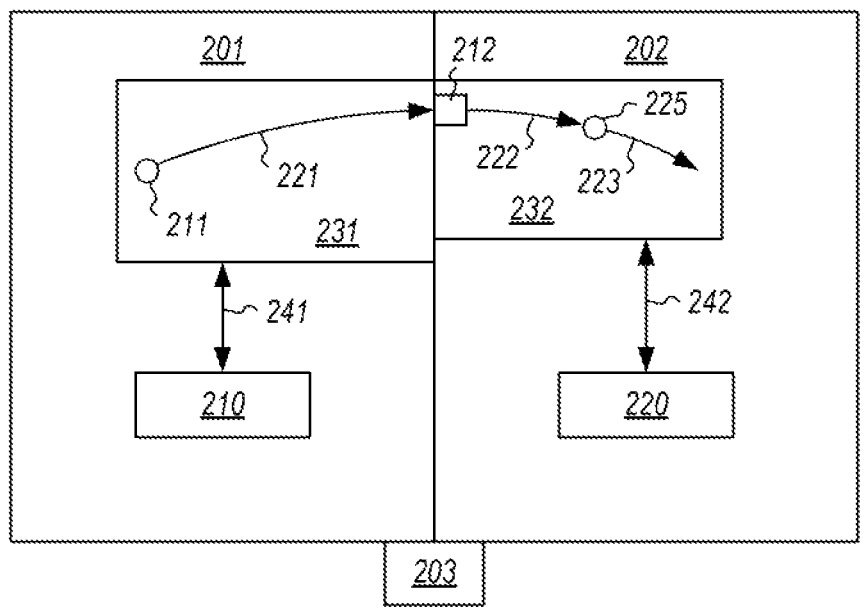
FIG. 2 illustrates a computing environment in which there are two virtualization contexts, a first virtualization context and a second virtualization context.

FIG. 2 illustrates a computing environment 200 in which there are two virtualization contexts, a first virtualization context 201 and a second virtualization context 202. The first virtualization context 201 has associated therewith computing resources 210. The second virtualization context 202 has associated therewith computing resources 220. Code 231 that operates in the first virtualization context 201 has access to the first computing resources 210 as represented by arrow 241, but not the second computing resources 220. Code 232 that operates in the second virtualization context 202 has access to the second computing resources 220 as represented by arrow 242, but not the second computing resources 210. Examples of computing resources 210 and 220 include files and registry keys.

The virtualization context defines a context in which code (such as an application) is executed. In a typical installation, an application is installed into a native environment of the computing system. Thus, the native environment is an example of a virtualization context, in which case the virtualization resources would be simply the native resources of the operating system (such as native files, registry keys, and so forth). In contrast, in application virtualization, an application is installed in a virtual environment, in which the application does not have direct access to the native resources of the operating system. Instead, the application has access to virtualization resources. The application might have "indirect" access to the native resources of the operating system. For instance, the application might read a native resource, but if the application attempts to modify the native resource, then a copy is made within the virtual environment and the operating system resources remain unchanged. Accordingly, a virtualization environment is another example of a virtualization context. As a computing system may have any number of virtualization environments, it is possible for a computing system to have any number of virtualization contexts including a native environment, and one or more virtualization environments.

As illustrated in FIG. 2, and as will be described in detail below, a thread 211 operates within code 231. During at least part, and potentially all of this time, the thread 211 also has access to the computing resources 210. The thread operates within the code 231, but then enters an entry point 212 into code 232 that is operating in the second virtualization context 202. As represented by arrow 222, the thread 211 operates within the code 232 without having access to the computing resources 220 of the second virtualization context 220 until an event 225 is encountered. A response to the event 225 is that the thread 211 may thereafter continue (as represented by arrow 223) with access to the computing resources 220 associated with the second virtualization context 220. A thread transition component 203 is configured to change the virtualization context of the thread 211 when the thread encounters the event 225 for code operating in a different virtualization context.

Figure 3:
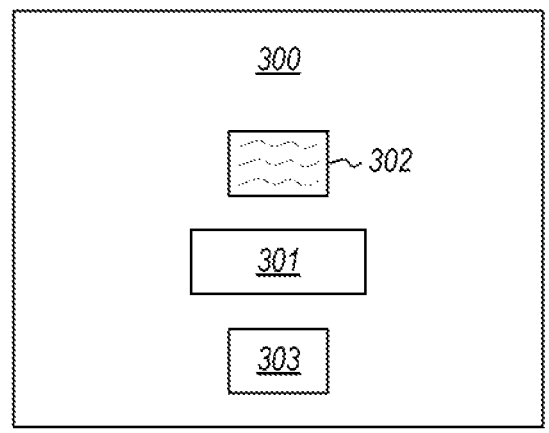
FIG. 3 illustrates one example virtualization environment, which includes a virtualization facilitation component that intercepts function calls from threads operating in the virtualization environment, and redirects the function calls to computing resources.

FIG. 3 illustrates one example virtualization environment 300, which includes a virtualization facilitation component 301 that intercepts function calls from threads 302 operating in the virtualization environment 300, and redirects the function calls to computing resources 303. From the perspective of the threads 302, the threads 302 are accessing computing resources associated with the virtualization environment. However, the actual computing resources 304 being accessed may be native resources, albeit managed to ensure that the virtualization environment does not interfere with the native environment or other virtualization environments.

Figure 4:
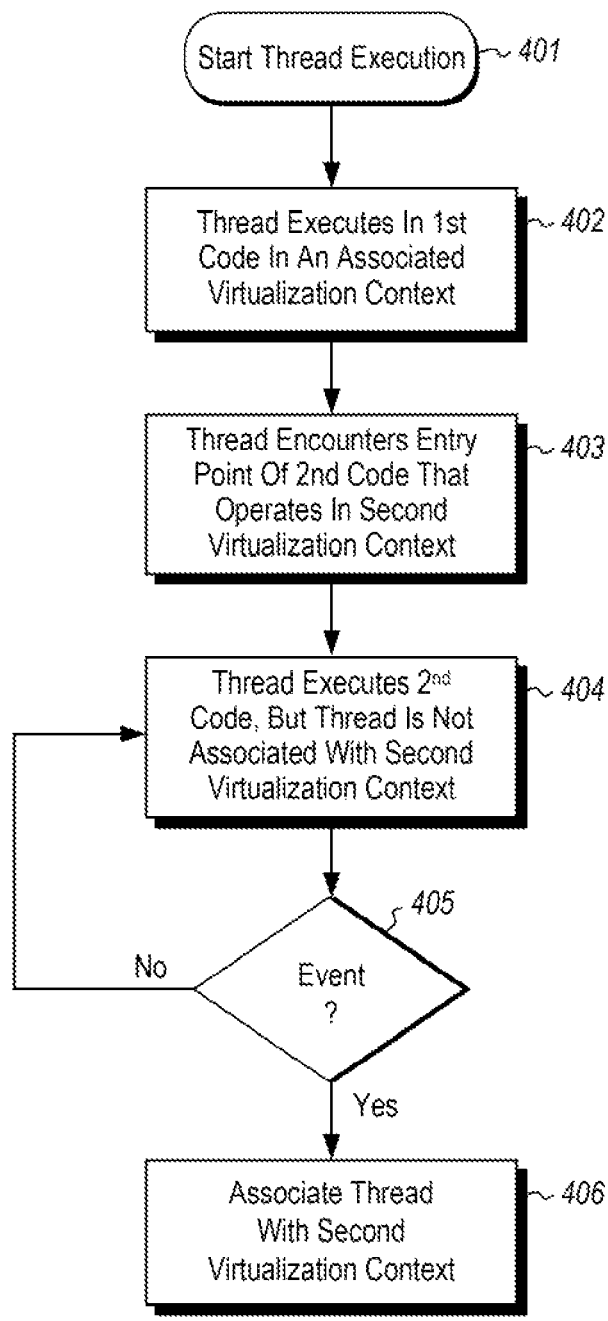
FIG. 4 illustrates a flowchart of a method for operating a thread across virtualization contexts.

FIG. 4 illustrates a flowchart of a method 400 for operating a thread across virtualization contexts. The thread starts executing (act 401) and continues executing (act 402) in an associated virtualization context. For instance, referring to FIG. 2, the thread 211 begins executing in the first virtualization context 201 within code 231. At least for a portion of the time that the thread 211 is executing within the code 231, the thread 211 has access to the first computing resources 210 associated with the first virtualization context 201. At this point, the thread 211 does not have access to the second computing resources 220 as such second computing resources 220 are within another virtualization context 202.

The thread then enters an entry point to code operating in a different virtualization context (act 403). However, at this initial entry, the thread is not yet associated with the second virtualization context. Instead, for a time, the thread executes on the code that is in the second virtualization context, even though the thread itself does not yet have access to the computing resources (act 404). For instance, in FIG. 2, as represented by arrow 222, before the thread 211 encounters event 225, the thread 211 operates for a time within the code 232 that is within the second virtualization context 202. Even so, the thread 211 itself is not yet associated with the second virtualization context 202 and thus does not have access to the computing resources 220.

This continues ("No" in decision block 405) until an event is detected ("Yes" in decision block 405). In some embodiment, the event might be the very act of the thread itself requesting access to the computing resources. For instance, in FIG. 2, the event 225 might be the thread 211 requesting access to the computing resources 220 of the second virtualization context 202. Other examples of events include a manual event. For instance, the code itself could assert that it belongs to a particular virtualization context. This could be embodied either externally, by having the event look in a lookup table that maps contexts to code or by having the actual source code modified to tell the event what context it belongs to.

Regardless, in response to the event ("Yes" in decision block 405), the thread is associated with the second virtualization context such that the thread has access to the second computing resources associated with the second virtualization context (act 406). For instance, in FIG. 2, the thread transition component may associate the thread 211 with the second virtualization context 202 in response to detecting the event 225.

There are several issues to note here which together lend enormous flexibility in the operation of the thread. The first point of flexibility resides in the concept that the method 200 may be performed to allow the thread to transition through any number of boundaries between virtualization contexts. Thus, for example, there may be multiple transitions represented by the arrow in FIG. 2, as the thread transitions from one virtualization context to the next, to the next, and so forth, until the thread terminates.

The second point of flexibility resides in the flexible nature of virtualization contexts. A virtualization context might be a native environment, or one of any number of possible virtualization contexts. For instance, suppose that three applications are virtualized on a computing system. The computing system would have potentially four different virtualization contexts: 1) a native environment of the computing system, 2) a virtualization environment distinct to one of the application virtualizations, 3) a virtualization environment distinct to a second of the application virtualizations, and 4) a virtualization environment distinct to the third of the application virtualizations.

Accordingly, referencing FIG. 2, the first and second virtualization contexts 201 and 202 have been left represented in the abstract, leaving the transition represented by the arrow also abstract. As examples of the abstract transition, the thread might transition from 1) a native environment to a virtualization environment, 2) from a virtualization environment to a native environment, and 3) from one virtualization environment to a second virtualization environment. Each of these transitions will now be discussed in further detail.

For instance, in one embodiment, the first virtualization context 201 is a native environment and the second virtualization context 202 is a virtualization environment. Accordingly, the arrow in FIG. 2, represents a thread that begins operating in a native environment and then continues in a virtualization environment. As an example, the thread might be begun with a process associated with a natively installed application. That thread may then enter the virtual environment to execute a plug in associated with a virtualized application. an act of registering origin information about the request on a processor call stack.

Recall that in act 406, the thread is associated with a new virtualization context. Recall also that this association might be performed in response to the thread requesting access to computing resources associated with the new virtualization context (while the thread is executing code that is in the new virtualization context). In a specific embodiment, this may be accomplished by having the thread itself (e.g., thread 211), or another component (such as component 301) place information (called herein "registered origin information") on that processor call stack. The thread transition component (e.g., component 203 of FIG. 2), may then use that registered origin information, along with the context of the registered origin information within the processor call stack, to identify that thread is to be associated with the second virtualization context.

Accordingly, the principles described herein provide for thread-based virtualization, allowing flexible thread usage of different code in different virtualization contexts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for operating a thread of a computer-executed process across boundaries of a plurality of virtualization contexts within an operating system, each virtualization context comprising an application execution environment and defining a context in which a computer-executed process executes which comprises its own virtual computing resources and which is isolated from virtual computing resources of other virtualization contexts, the each virtualization context intercepting and redirecting operating system calls from the executing process to provide an illusion that the executing process is executing within a native operating system environment of a computer, the method comprising:
   a thread operating in a first virtualization context and having access to first computing resources associated with the first virtualization context, the first computing resources being isolated from other computing resources of other virtualization contexts;
   the thread entering an entry point to code associated with a second virtualization context that has access to second computing resources associated with the second virtualization context;
   while the thread is operating on the code, detecting an event; and
   in response to detecting the event, associating the thread with the second virtualization context such that the thread has access to the second computing resources associated with the second virtualization context;
   wherein the associating with the second virtualization context is performed using at least a registered origin information.

2. The method in accordance with claim 1, wherein the event is the thread requesting access to the second computing resources.

3. The method in accordance with claim 2, further comprising:
   registering the origin information about the request on a processor call stack.

4. The method in accordance with claim 1, wherein identifying that the thread is to be associated with the second virtualization context is performed also using a context of the registered origin information within the processor call stack.

5. The method in accordance with claim 1, wherein the first virtualization context is a native environment and the first computing resources are native resources, and the second virtualization context is a virtualization environment and the second computing resources are virtual resources.

6. The method in accordance with claim 1, wherein the first virtualization context is a first virtualization environment and the first computing resources are first virtual resources, and the second virtualization context is a second virtualization environment and the second computing resources are second virtual resources.

7. The method in accordance with claim 1, further comprising:
after associating the thread with the second virtualization context, redirecting one or more subsequent requests from the thread to the second computing resources.

8. The method in accordance with claim 7, wherein the code is a plug-in.

9. A computer program product comprising one or more computer-readable hardware storage devices having stored thereon computer-executable instructions that are structured such that, when executed by one or more processors of a computing system, cause the computing system to perform a method for operating a thread of a computer-executed process across the boundaries of a plurality of virtualization contexts within an operating system, each virtualization context comprising an application execution environment and defining a context in which a computer-executed process executes which comprises its own virtual computing resources and which is isolated from virtual computing resources of other virtualization contexts, the each virtualization context intercepting and redirecting operating system calls from the executing process to provide an illusion that the executing process is executing within a native environment of a computer, the method comprising:
a thread operating in a first virtualization context and having access to first computing resources associated with and accessible to the first virtualization context and the first computing resources being isolated from other computing resources of other virtualization contexts;
the thread entering an entry point to code associated with a second virtualization context having access to second computing resources associated with and accessible to the second virtualization context;
while the thread is operating on the code and while still operating in the first virtualization context, requesting access to the second computing resources; and
registering an origin of the request to access the second computing resources as being the code.

10. The computer program product in accordance with claim 9, wherein the origin is used to associate the thread with the second virtualization context such that the thread has access to the second computing resources.

11. The computer program product in accordance with claim 9, wherein the registration of the origin is in a processor call stack.

12. The computer program product in accordance with claim 9, wherein the first virtualization context is a native environment and the first computing resources are native resources, and the second virtualization context is a virtualization environment and the second computing resources are virtual resources.

13. The computer program product in accordance with claim 9, wherein the first virtualization context is a first virtualization environment and the first computing resources are first virtual resources, and the second virtualization context is a second virtualization environment and the second computing resources are second virtual resources.

14. A computer program product comprising one or more computer-readable hardware storage devices having stored thereon computer-executable instructions that are structured such that, when executed by one or more processors of a computing system, cause the computing system to perform a method for transitioning a thread across a plurality of virtualization contexts within an operating system, each virtualization context comprising an application execution environment and defining a context in which a computer-executed process executes which comprises its own virtual computing resources and which is isolated from virtual computing resources of other virtualization contexts, the each virtualization context intercepting and redirecting operating system calls from the executing process to provide an illusion that the executing process is executing within a native environment of a computer, the method comprising:
detecting an event associated with a thread operating on code in a first virtualization environment of a first virtualization context, the first virtualization environment having access to first computing resources and the first virtualization environment being isolated from other computing resources of other virtualization environments; and
in response to detecting the event, associating the thread with a second virtualization environment of a second virtualization context such that the thread has access to computing resources associated with the second virtualization environment, wherein associating with the second virtualization context is performed using at least a registered origin information.

15. The computer program product in accordance with claim 14, wherein the event is the thread requesting access to the computing resources.

16. The computer program product in accordance with claim 15, wherein associating the thread with the second virtualization environment further comprises:
identifying that that thread is to be associated with the second virtualization environment using at least the registered origin information that was caused to be registered in response to the request.

17. The computer program product in accordance with claim 16, wherein the registered origin information is within a processor call stack.

18. The computer program product in accordance with claim 17, wherein identifying that the thread is to be associated with the second virtualization environment is performed using a context of the registered origin information within the processor call stack.

19. The computer program product in accordance with claim 14, the method further comprising:
after associating the thread with the second virtualization environment, redirecting one or more subsequent requests from the thread to the computing resources associated with the second virtualization environment.

* * * * *